Patented Sept. 28, 1943

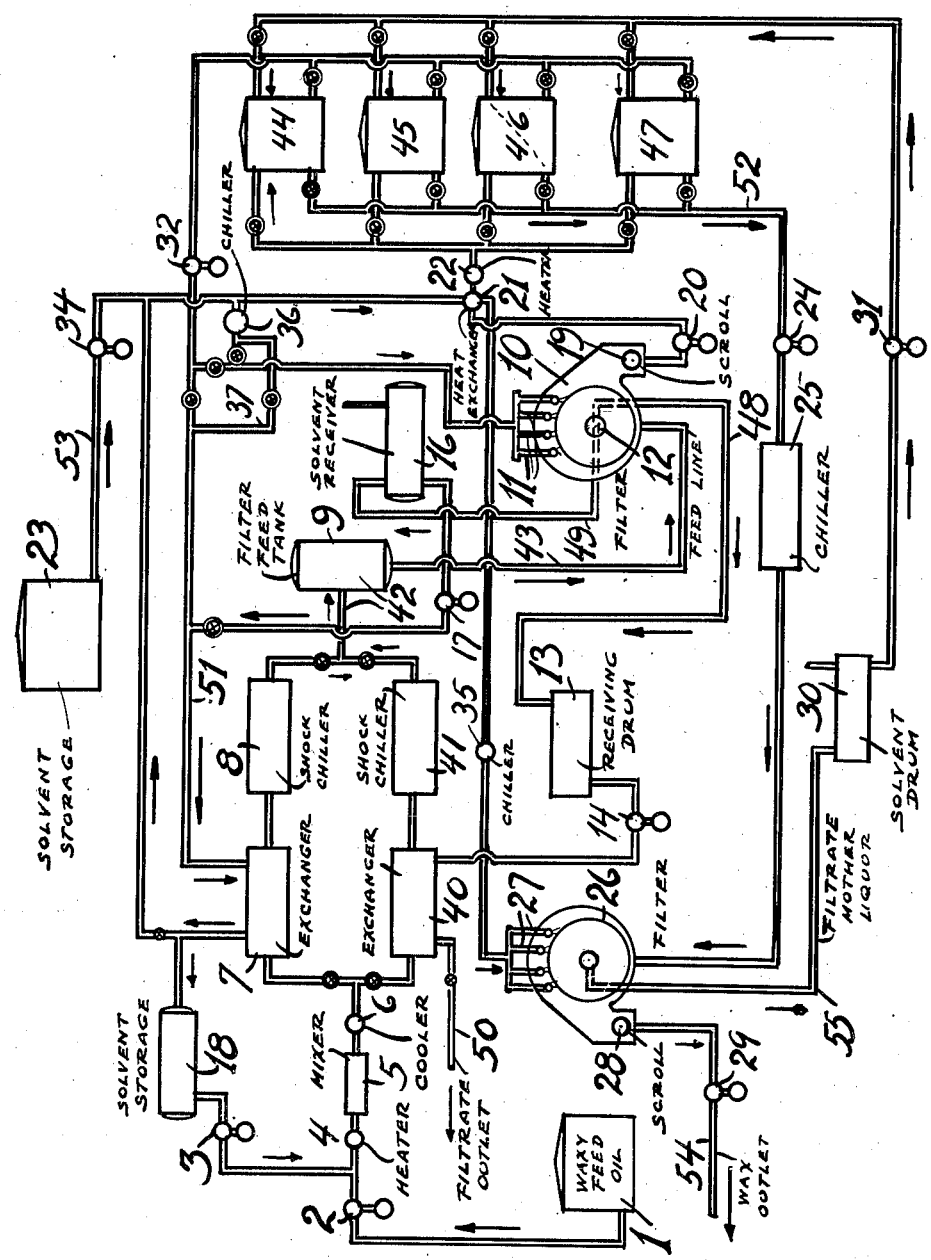

2,330,740

UNITED STATES PATENT OFFICE 2,330,740

DEWAXING PROCESS

Oldrich S. Pokorny, Sarnia, Ontario, and Herbert H. Moor, Moore Township, Lambton County, Ontario, Canada, assignors to Standard Oil Development Company, a corporation of Delaware Application January 20, 1940, Serial No. 314,734

1 Claim. (Cl. 196—18)

The present invention relates to the removal of waxy constituents from wax-bearing mineral oils and is especially directed to an improved process for the production of high quality petroleum waxes. In accordance with the present process, waxy constituents are removed from wax-bearing oils by chilling the oil to precipitate the waxy constituents, which constituents are then removed from the dewaxed oil by suitable means such as centrifuging, filtering, and the like. Undesirable high melting point non-waxy constituents are removed from the wax cake by heating the cake and fractionally precipitating and separating waxes of the desired melting point.

It is well known in the art to remove waxy constituents from wax-bearing mineral oils by various methods. In general, the waxy constituents are removed by chilling the oil to a temperature at which the waxy constituents are precipitated. The precipitated constituents are then separated from the dewaxed oil by suitable filtering or centrifuging means. In order to increase the efficiency of the dewaxing operation, various dewaxing solvents are employed. These solvents, in general, have a preferential selectivity for the non-waxy constituents and tend to throw out waxy constituents from the solution. Dewaxing solvents of this character are light naphtha, liquefied normally gaseous hydrocarbons, and the like. The cold filtrate solution comprising the dewaxed oil and the dewaxing solvent after separation from the precipitated waxy constituents is handled in a manner to remove the solvent and recover the dewaxed oil. The generally accepted method for the handling of the wax cake or wax slurry in order to reduce the amount of the oil is to repuddle the same with additional quantities of pre-cooled solvent and then to re-filter the solution. The wax cake is then handled in a manner to remove the solvent, usually by distillation, and then subjected to various so-called sweating or equivalent operations in an attempt to completely remove the oil and to segregate refined waxes of various quality having the desired melting points. The sweated waxes may be further refined by treatment with sulfuric acid, activated carbon or clays in order to obtain the desired color, color stability, and other characteristics.

We have now discovered that in dewaxing operations of this character, hydrocarbons other than normal paraffin waxes are precipitated when dewaxing is carried out at temperatures of the order of 20° F. or below. These non-waxy hydrocarbon constituents are characterized by a high boiling point in the range from about 500° F. to 550° F. at a pressure of 1 mm. of mercury, a relatively low melting point usually in the range from about 70° F. to 125° F. A. S. T. M. method, designation D 87-37, and a refractive index of the order of 1.433 to 1.453 at 60° C. Since the melting points of these non-waxy hydrocarbons are 20° F. to 50° F. below the melting points of the normal paraffin hydrocarbons of similar boiling points, fractional distillation cannot effectively be used in order to separate these non-waxy hydrocarbon constituents from normal highly paraffinic waxy hydrocarbon constituents. However, we have discovered that these high molecular weight non-paraffinic types of hydrocarbon constituents are more soluble in dewaxing solvents than the normal paraffinic waxy type hydrocarbons. We have also discovered that the wax cake or slurry produced by filtering or centrifuging the cold waxy mixture in the dewaxing process contains a sufficient amount of solvent so that it is possible to handle the wax cake and to segregate the non-waxy constituents from the waxy constituents by means of a fractional crystallization process. Furthermore, it is possible, in accordance with the present process, not only to segregate the paraffinic type waxy constituents from the non-paraffinic type non-waxy constituents, but it is also possible to segregate the paraffinic type waxy constituents into various refined wax fractions of varying melting points.

The process of our invention may be readily understood by reference to the attached drawing illustrating one modification of the same. A wax-bearing mineral oil, which for the purposes of description is taken to be a wax-bearing petroleum oil boiling in the lubricating oil range, is withdrawn from waxy feed oil storage 1 by means of pump 2 and mixed with a dewaxing solvent which is withdrawn from solvent storage 13 by means of pump 3. For purposes of description it is assumed that the dewaxing solvent comprises methyl normal propyl ketone. The mixture is passed through heater 4 in which the temperature is raised to a degree adapted to secure complete miscibility between the respective constituents. The heated mixture is passed through mixer 5 and cooler 6, in which the temperature is lowered to a point above the point of crystallization and then divided into two streams. One stream is cooled under controlled conditions in exchanger 7 and then shock chilled in shock chiller 8 to the desired dewaxing temperature, while the other stream is cooled to the desired dewaxing temperature under controlled conditions in exchanger 40 and shock cooled in shock chiller 41. The cooling medium employed may be any suitable reagent such as ammonia, a liquefied normally gaseous hydrocarbon, or other refrigerant. The two streams are combined and passed to filter feed tank 9 by means of line 42.

The chilled mixture is withdrawn from filter feed tank 9 by means of line 43 and introduced into filtering unit 10, which for the purposes of description is assumed to be a rotary type filter. The waxy constituents accumulate as a wax cake on the surface of the drum and are removed by a scraper and delivered into a scroll 19. Prior to removing the wax cake from the filter drum, it is washed with additional wash solvent which is introduced by means of spray lines 11. The cold filtrate comprising substantially the entire amount of the solvent and the dewaxed oil is withdrawn from filter 10 through filter valve 12 and introduced into filtrate receiving drum 13 by means of line 48.

The wash solvent introduced by means of spray pipes 11 is segregated from the filtrate, withdrawn through filter valve 12 and introduced into wash solvent receiver 16 by means of line 49. The cold filtrate is passed through heat exchanger 40 and removed from the dewaxing system by means of line 50. This stream is then handled in a manner to completely remove the solvent from the dewaxed oil and to further refine the dewaxed oil in any manner desirable. The cold wash solvent is withdrawn from wash solvent receiver 16 by means of pump 17 and line 51, passed through heat exchanger 7 and introduced into solvent storage 18.

The waxy constituents are removed from scroll 19 by means of pump 20, passed through heat exchanger 21, heater 22, and then passed into one of a series of tanks 44, 45, 46, and 47. When the initial tank, as for example, tank 44, is filled with wax slurry, the discharge is swung to another tank, as for example, tank 45. The hot mixture is withdrawn from tank 44 by means of line 52 and pump 24, passed through chiller 25 and introduced into filter 26, which for the purposes of description is taken to be a rotary type filter. The temperature of the mixture leaving chiller 25 and passed to filter 26 is controlled to precipitate the particular wax fraction desired. The precipitated wax is removed and segregated on the drum of filter 26. The segregated wax is washed completely free of mother liquor by means of fresh solvent which is withdrawn from solvent storage 23 by means of line 53 and pump 34, passed through heat exchanger 21, further chilled in chiller 35, and then introduced into filter 26 by means of spray lines 27. Any suitable refrigerant may be employed in chiller 35, as for example, ammonia, a liquefied normally gaseous hydrocarbon such as propane, or the like.

The precipitated wax is removed from the drum of filter 26, delivered into scroll 28, and removed from the system by means of pump 29 and line 54. The wax may be further refined in any desirable manner by treatment with sulfuric acid, clays, and the like. The mother liquor combined with the wash solvent is removed from filter 26 by means of line 55, passed into wash solvent drum 30 and then delivered by means of pump 31 to one of the empty tanks, as for example, tank 46. When tank 44 is empty and tank 46 is full, the valves are adjusted so that the liquor is removed from tank 46. The mixture removed from tank 46 is passed through chiller 25, the temperature of which is lowered to obtain the precipitation of a wax cut having the next lower desired melting point range. The resulting precipitated wax fraction is separated from the mother liquor in a manner described with respect to the initial wax fraction precipitated. The mother liquor is again recycled in the manner described and the temperature progressively lowered in chiller 25 to secure additional wax fractions of lower melting point ranges. The mother liquor is stepwise chilled in this manner until finally a temperature is reached, at which point the mother liquor removed from filter 26 by means of line 55 contains nothing but dissolved oil. The mother liquor is then removed from the particular tank by means of pump 32 and delivered to the spray lines of filter 10 as described above. The mother liquor free of waxy constituents may also be delivered to exchanger 7 and utilized for diluting the incoming waxy feed oil as described. If spent mother liquor delivered by means of pump 32 is insufficient for the wash requirements in filter 10, fresh chilled solvent from chiller 36 may also be employed as wash solvent. It is to be understood that by means of by-pass 37 fresh solvent may be used for diluting the incoming waxy feed.

The process of the present invention may be widely varied. The operation may be employed for the removal of waxy constituents and for the production of desirable wax fractions from any feed oil. The waxy constituents may be precipitated in any desirable manner. Indirect chilling of the waxy feed oil may be secured by the use of ammonia or by means of an equivalent solvent. The waxy charge oil may be directly chilled by utilizing a refrigerant of the type of a liquefied normally gaseous hydrocarbon, as for example, propane.

Although the present process may be employed in any dewaxing operation, it is particularly applicable in solvent dewaxing operations in which aliphatic ketones are utilized as dewaxing solvents. Preferred solvents are aliphatic ketones containing a normal alkyl group and a total of five or six carbon atoms in the molecule. It is desired that the alkyl group contain at least three carbon atoms. Typical examples of this group of solvents are methyl normal propyl ketone, methyl normal butyl ketone, and ethyl normal propyl ketone. An especially preferred solvent is a mixture of methyl normal propyl ketone with methyl normal butyl ketone. These solvents are characterized by extremely low wax solubility at dewaxing temperatures, by low miscibility temperatures with oil and by extremely high filter rates in solution with the oil at low temperatures. The structure of the wax cake formed in the dewaxing operation is such that the oil content of the slack wax can be reduced down to between 3% and 15% by means of the washing operation described above. We have discovered that when using solvents of this character, a sufficient amount of the solvent remains in the wax cake or slurry so that the present operation may be readily carried out. We have discovered that the high melting point nonwaxy hydrocarbons other than normal paraffins are more soluble in higher mixed aliphatic ketones than the normal paraffin type hydrocarbons. We have also found that the wax cake or slurry produced by filtering or centrifuging the cold mixture in the dewaxing process contains a sufficient amount of the solvent so that it is possible to segregate the above two types of solid hydrocarbon constituents of wax-bearing lubricating oil distillates by means of fractional crystallization. Because of the high selective action upon normal paraffin waxy hydrocarbons and the low oil content of the filter cake, our process also permits fractionation of waxes according to their melting points. Although it is preferred that the wax cake be heated and handled in the manner described without the addition of additional solvent, under certain operating conditions it may be desirable to add additional solvent to the wax slurry produced in the solvent dewaxing operation in order to improve the deoiling of the solid waxy hydrocarbon constituents which separate out during the respective cooling stages.

In order to further illustrate our invention, the following examples are given which should not be construed as limiting the same in any manner whatsoever:

EXAMPLE 1

A Mid-Continent crude waxy distillate boiling in the lubricating oil range having a viscosity of 75 seconds Saybolt Universal was dewaxed as described using methyl normal butyl ketone as the dewaxing solvent. The wax cake secured had a Saybolt viscosity of 48.5 seconds at 210° F. and contained between about 17% to 25% of solvent-free slack wax. The wax cake was heated to a temperature above about 100° F. in order to completely dissolve all the hydrocarbons in the dewaxing solvent remaining in the filter cake after the solvent dewaxing step. The solution was then cooled in the manner described to a temperature of about 105° F., 90° F., 80° F., 65° F., 40° F. and 0° F. After each chilling step, the crystalline solids were separated from the mother liquor by means of a filter. The respective wax cakes were washed with relatively small amounts of wash solvent and the respective resulting filtrates mixed with the mother liquor. The respective wax cakes were completely freed of solvent by means of a distillation step. The mother liquor filtrate from the final separation step conducted at a temperature between about +25° F. and 0° F. contained substantially all the oil originally present in the wax cake, as well as from 5% to 30% of very low melting point range non-paraffinic type hydrocarbon constituents. The pour point of this oil varied between about 30° F. and 45° F. Since a concentration of oil in this mixture of mother liquor and wash solvent resulting from the respective deoiling and recrystallization stages is in the range from about 2% to 5%, it is not necessary to remove the solvent in order to recover the dissolved oil. It is more advantageous to add the solvent mixture with the feed waxy distillate or to employ the mixture for washing the wax cake formed in the filter. Thus, the oil is ultimately disposed in the original filtrate at the dewaxing plant as dewaxed oil.

The results of the operations were as follows:

when dewaxing paraffin distillate having a Saybolt Universal viscosity of 168 seconds at 100° F. to +10° F. pour point was heated to about 130° F. to effect substantially complete solution of the solid constituents. The solution was cooled in a number of steps as described to a temperature of about 85° F., 75° F., 64° F., 40° F. and +8° F. After each cooling step the precipitated wax was segregated by filtration or centrifuging. The wax cakes so formed were washed with relatively small amounts of fresh dewaxing solvent and the solvent recovered from the respective wax cakes by distillation or other means. The yields of waxes obtained are summarized below:

Table 2

| | | | | | |
|---|---|---|---|---|---|
| Charge of wax slurry (filter cake) | 2950 pts. by wt., containing 534.5 pts. by wt. of slack wax | | | | |
| Temp of filtration and washing, °F | 85 | 75 | 64 | 40 | 8 |
| Volume of wash solvent used, pts | 380 | 250 | 250 | 250 | 250 |
| Yield of wax (solvent-free) pts. by wt | 132.9 | 88.5 | 100.1 | 77.4 | 47.0 |
| Melting point, A. S. T. M. °F | 138.4 | 128.6 | 119.6 | 111.7 | 101.2 |
| Expressible oil, percent by wt | Nil | Nil | 0.17 | | |
| Refractive index, at 60° C., $N_D$ 60° C | 1.4376 | 1.4368 | 1.4375 | 1.4364 | 1.4373 |

The process of the present invention is not to be limited by any theory or mode of operation, but only in and by the following claim in which it is desired to claim all novelty in so far as the prior art permits.

We claim:

Improved process for the removal of waxy constituents from waxy petroleum oils and for the segregation of said waxy constituents into various melting point fractions substantially free of non-waxy hydrocarbons having relatively low melting points, comprising mixing with said waxy petroleum oil a solvent selected from the class of aliphatic ketones characterized by containing an alkyl group and a total of five or six carbon atoms in the molecule, heating said mixture to secure complete miscibility between the respective constituents, chilling the heated mixture to a temperature at which said waxy constituents precipitate, separating a filtrate comprising the dewaxed oil and dewaxing solvent, removing the dewaxing solvent from said dewaxed oil, separating the waxy constituents, reheating the same to a temperature at which a liquid miscible phase is secured, gradually cooling the heated liquid under conditions adapted to progressively fractionally crystallize oil-free wax fractions of progressively lower melting point ranges substantially free of non-waxy low melting point hydrocarbons and under conditions adapted to retain the low melting point non-waxy constituents in the mother liquor, separating the respective wax fractions as they crystallize, washing the respective wax fractions with fresh solvent, combining the mother liquor and the respective wash filtrates and returning the mixture to the waxy feed oil.

Table 1

| | | | | | | | |
|---|---|---|---|---|---|---|---|
| Charge of wax filter cake | 2315 pts. by wt. containing 410 pts. slack wax | | | | | | |
| Temp. of filtration and washing, °F | 113 | 105 | 91 | 80 | 65 | 40 | 0 |
| Volume of wash solvent used, pts | 500 | 310 | 340 | 200 | 206 | 306 | 352 |
| Yield of wax (solvent-free) pts. by wt | 26.9 | 30.1 | 63.5 | 37.5 | 59.4 | 59.4 | 27.5 |
| Melting point, A. S. T. M., °F | 163.0 | 158.0 | 147.0 | 139.0 | 127.0 | 112.5 | 99.4 |
| Expressible oil, per cent by wt | Nil | Nil | Nil | Nil | 0.88 | 0.53 | |
| Type of solid hydrocarbons | Normal paraffin hydrocarbons (waxes). | | | | Solid hydrocarbon constituents of an unknown structure. | | |
| Refractive index at— | | | | | | | |
| 80° C., $N_D$ 80° C | 1.4362 | 1.4359 | 1.4373 | 1.4372 | 1.4384 | | |
| 60° C., $N_D$ 60° C | | | | | | 1.4448 | 1.4474 | 1.4501 |

EXAMPLE 2

A wax cake produced at the dewaxing plant

OLDRICH S. POKORNY.
HERBERT H. MOOR.